(12) United States Patent
Lai

(10) Patent No.: US 8,420,246 B2
(45) Date of Patent: Apr. 16, 2013

(54) ELECTRONIC DEVICE WITH SLIDING BATTERY COVER

(75) Inventor: Jin-Shi Lai, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 130 days.

(21) Appl. No.: 13/040,246

(22) Filed: Mar. 3, 2011

(65) Prior Publication Data

US 2012/0164518 A1 Jun. 28, 2012

(30) Foreign Application Priority Data

Dec. 27, 2010 (CN) .......................... 2010 1 0606868

(51) Int. Cl.
*H01M 2/10* (2006.01)
*H05K 5/00* (2006.01)
*H04B 1/38* (2006.01)

(52) U.S. Cl.
USPC .......... 429/100; 429/96; 429/151; 361/679.1; 361/679.2; 361/679.28; 455/90.3; 455/347; 455/575.1

(58) Field of Classification Search .................. None
See application file for complete search history.

(56) References Cited

U.S. PATENT DOCUMENTS 7,068,495 B2 * 6/2006 Luo et al. ................. 361/679.56

FOREIGN PATENT DOCUMENTS

| CN | 2613890 Y | 4/2004 |
|----|-----------|--------|
| CN | 2763984 Y | 3/2006 |

* cited by examiner

*Primary Examiner* — Cynthia Walls
(74) *Attorney, Agent, or Firm* — Altis Law Group, Inc.

(57) ABSTRACT

An electronic device with sliding battery cover includes a housing, a battery holder formed in the housing, a fixing element rotatably connected to the battery holder, and a battery cover slidably connected to the fixing element to cover or uncover the battery holder. The battery holder is for placing at least one battery. The fixing element includes at least one conductive elastic element. When the battery cover covers the battery holder, each conductive elastic element contacts an electrode of one of the at least one battery placed in the battery holder, and the battery cover is locked to the battery holder; when the battery cover is to uncover the battery holder, a force applied to the battery cover makes the battery cover slide along the fixing element to unlock the battery cover from the battery holder.

5 Claims, 4 Drawing Sheets

ELECTRONIC DEVICE WITH SLIDING BATTERY COVER

BACKGROUND

1. Technical Field

The present disclosure relates to an electronic device with a sliding battery cover.

2. Description of Related Art

Batteries, especially dry cell batteries, are usually placed in a battery holder. One end of the battery holder defines conductive element while the other end of the battery holder sets a metal spring, and the dry cell battery is placed between the conductive element and the metal spring. However, it is difficult to remove the batteries from this battery holder or install the batteries into this battery holder. Furthermore, the battery holder may be easily damaged from repeated replacement of the batteries.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
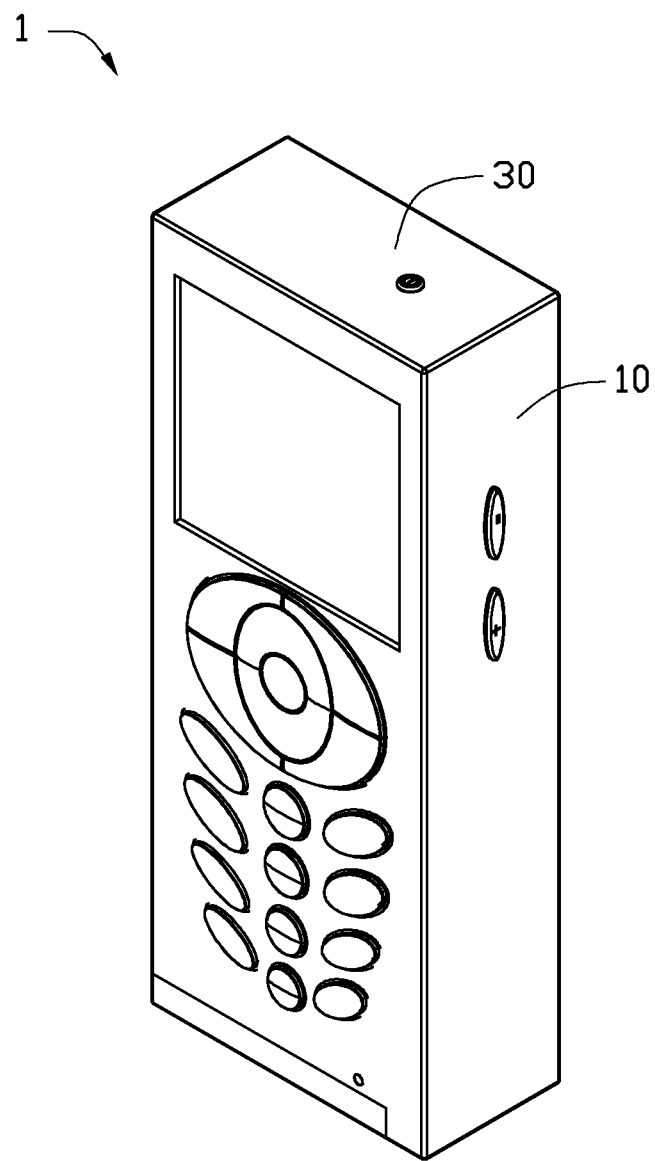
FIG. 1 is an isometric view of an electronic device with a sliding battery cover, in accordance with an exemplary embodiment.
Figure 2:
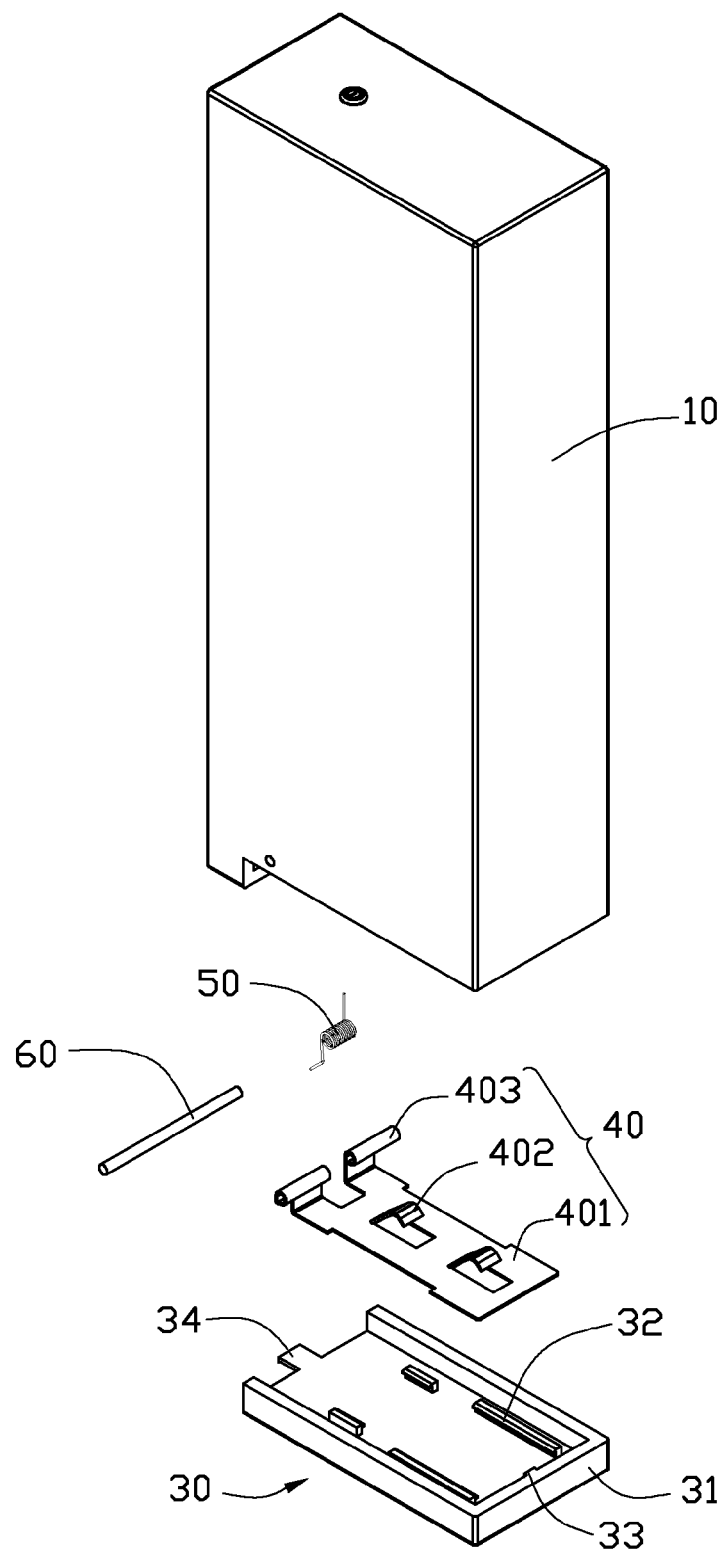
FIG. 2 is an exploded, isometric view of the electronic device of FIG. 1.
Figure 3:
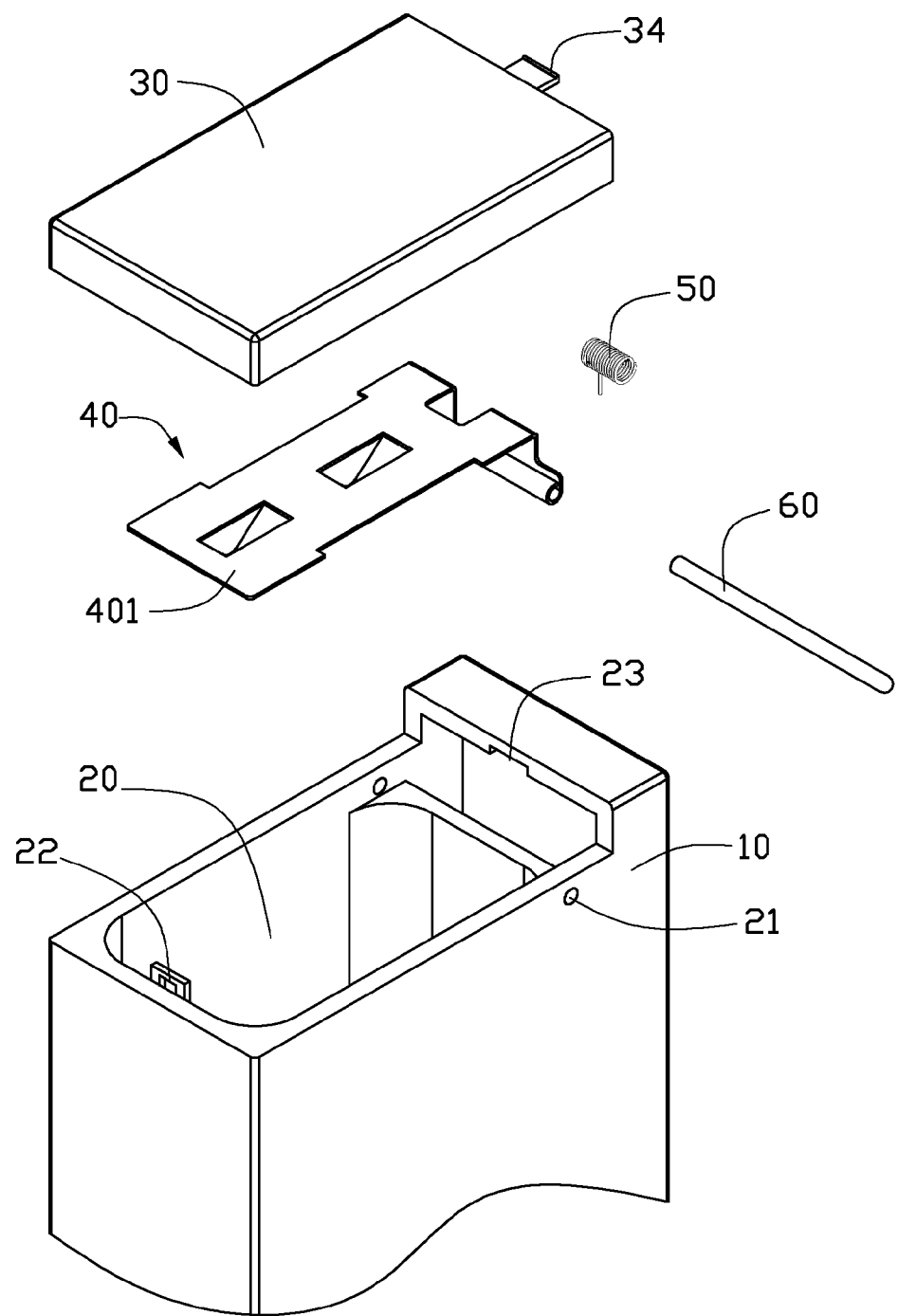
FIG. 3 is an exploded isometric view of the electronic device of FIG. 1, viewed in another direction.

Referring to FIGS. 1-3, an electronic device 1 includes a housing 10, a battery holder 20, a battery cover 30, and a fixing element 40. The battery holder 20 formed in the housing 10 is for placing batteries (not shown). The battery cover 20 is slidably connected to the fixing element 40. The fixing element 40 is rotatably connected to the battery holder.

The battery cover 30 includes a main body 31 and two grooves 32. The two grooves 32 are defined at the inner surface of the main body 31. The fixing element 40 includes a base member 401 and at least one conductive elastic element 402. The conductive elastic elements 402 are formed at the base member 401. The number of the conductive elastic elements 402 is equal to the number of the batteries placed in the battery holder 20. The base member 401 is placed in the two grooves 32 and engages with the two grooves 32 to make the base member 401 slide along the two grooves 32. An axle hole 403 is defined in the two symmetrical inner walls of the battery holder 20 respectively. A torsion spring 50 is disposed between the two axle holes 403. An axle 60 passes through the torsion spring 50 and the two axle holes 403. Two axle holes 21 are defined in the inner wall of the battery holder 20. The axle 60 also passes through the two axle holes 21 to connect the fixing element 40 to the battery holder 20.

One end of the main body 31 defines a hook 33. A hook receiver 22 engaged with the hook 33 is defined at the battery holder 20.

When the battery cover 30 is operable to lock to the battery holder 20, each conductive elastic element 402 contacts an electrode of the battery placed in the battery holder 20 and is deformed; the torsion spring 50 is deformed and one torque arm of the torsion spring 50 resists the fixing element 40 and the other torque arm of the torsion spring 50 resists the battery holder 20; the hook receiver 22 receives the hook 22, thereby the battery cover 30 is locked at the battery holder 20.

Figure 4:
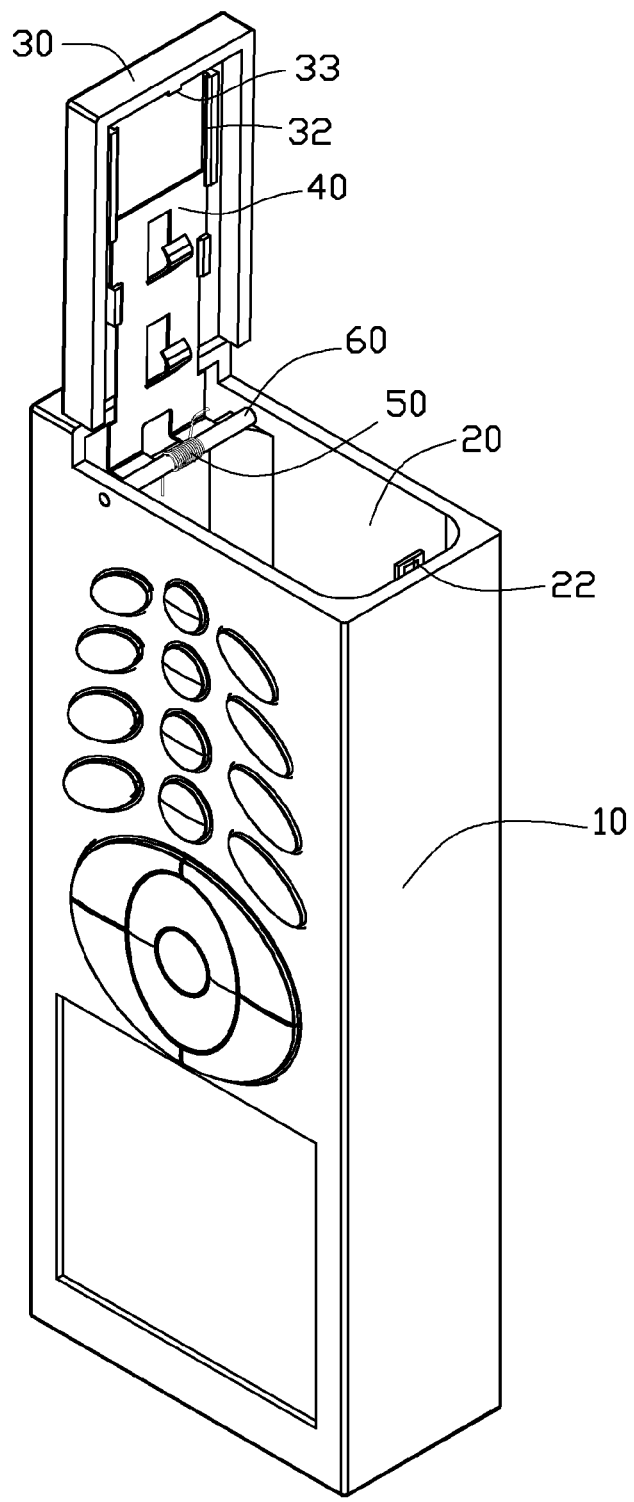
FIG. 4 is an isometric view of the electronic device of FIG. 1 when the battery cover of the electronic device is unlocked.

As shown in FIG. 4, when a force is applied to the battery cover 30 to make the battery cover 30 slide along the fixing element 40 to the hook 33, the hook 33 is detached from the hook receiver 22, an elastic force generated by the torsion spring 50 makes the fixing element 40 rotate around the axle 60 to unlock the battery cover 30. Thus, the batteries can be taken out from the battery holder 20.

In the present disclosure, in order to lock the battery cover 30 stably to the battery holder 20, the other end of the main body 31 defines a clip 34 that protrudes from the main body 31, a slot 23 matched with the clip 34 is defined at the battery cover 20. When the battery cover 30 is locked to the battery holder 20, the clip 34 engages with the slot 23. When the battery cover 30 slides along the fixing element 40 to make the clip 34 detach from the slot 23, the elastic force generated by the torsion spring 50 unlocks the battery cover 30.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An electronic device comprising:
   a housing;
   a battery holder formed in the housing for placing at least one battery, and comprising two symmetrical inner walls, each symmetrical inner wall defining an axle hole;
   a battery cover configured to cover or uncover the battery holder;
   a fixing element comprising a base member slidably connected to the battery cover and at least one conductive elastic element formed at the base member, the fixing element defining two axle holes at one end of the base member, and the at least one conductive elastic element being connected to an electrode of the at least one battery; and
   an axle passing through the axle holes of the battery holder and being directly connected to the battery holder, the axle further passing through the axle holes of the fixing element to rotatably connect the fixing element to the battery holder;
   wherein when the battery cover covers the battery holder, each conductive elastic element contacts the electrode of one of the at least one battery placed in the battery holder, and the battery cover is locked to the battery holder; when the battery cover is to uncover the battery holder, a force applied to the battery cover makes the battery cover slide along the fixing element to unlock the battery cover from the battery holder.

2. The electronic device as described in claim 1, wherein the battery cover comprises a main body and two grooves, the two grooves are defined at the inner surface of the main body, the base member is placed in the two grooves and engages with the two grooves to make the base member slide along the two grooves.

3. The electronic device as described in claim 2, wherein a torsion spring is disposed between the two axle holes of the fixing element, the axle passes through the torsion spring, the torsion spring is deformed and one torque arm of the torsion spring resists the fixing element and the other torque arm of the torsion spring resists the battery holder when the battery cover is locked to the battery holder, and an elastic force generated by the torsion spring makes the fixing element rotate around the axle to unlock the battery cover when a force is applied to the battery cover to make the battery cover slide along the fixing element.

4. The electronic device as described in claim 2, wherein the main body of the battery cover comprises a first end, the first end defines a hook and a hook receiver engaged with the hook is defined at the battery holder, when the battery cover is operable to lock to the battery holder, the hook receiver receives the hook, the hook is detached from the hook receiver when a force is applied to the battery cover to make the battery cover slide along the fixing element to the hook.

5. The electronic device as described in claim 4, wherein the main body of the battery cover further comprises a second end opposite to the first end, the second end defines a clip that protrudes from the main body, a slot matched with the clip is defined at the battery cover, the clip engages with the slot when the battery cover is locked to the battery holder, the battery cover is unlocked when the battery cover slides along the fixing element to make the slip detached from the slot.

\* \* \* \* \*